US010837592B2

(12) United States Patent
Coffman, III et al.

(10) Patent No.: US 10,837,592 B2
(45) Date of Patent: Nov. 17, 2020

(54) SUPPORT FRAME FOR POSITIVE PRESSURE BLOWER

(71) Applicant: Tempest Technology Corporation, Fresno, CA (US)

(72) Inventors: Leroy B. Coffman, III, Clovis, CA (US); William T. Allen, Sanger, CA (US)

(73) Assignee: Tempest Technology Corporation, Fresno, CA (US)

( * ) Notice: Subject to any disclaimer, the term of this patent is extended or adjusted under 35 U.S.C. 154(b) by 117 days.

(21) Appl. No.: 15/888,992

(22) Filed: Feb. 5, 2018

(65) Prior Publication Data

US 2018/0224055 A1     Aug. 9, 2018

Related U.S. Application Data

(60) Provisional application No. 62/563,583, filed on Sep. 26, 2017, provisional application No. 62/455,173, filed on Feb. 6, 2017.

(51) Int. Cl.
| | |
|---|---|
| *F16M 3/00* | (2006.01) |
| *F04D 29/40* | (2006.01) |
| *F16M 1/04* | (2006.01) |
| *F04D 29/60* | (2006.01) |
| *F04D 19/00* | (2006.01) |

(52) U.S. Cl.
CPC ............. *F16M 3/00* (2013.01); *F04D 19/002* (2013.01); *F04D 29/403* (2013.01); *F04D 29/601* (2013.01); *F16M 1/04* (2013.01)

(58) Field of Classification Search
CPC .......... F16M 3/00; F16M 1/04; A62C 3/0207; F04D 29/646; F04D 29/601; F04D 29/403; F04D 19/002
See application file for complete search history.

(56) References Cited

U.S. PATENT DOCUMENTS

| | | |
|---|---|---|
| 1,718,962 A | 7/1929 | Kimball |
| 1,972,654 A | 9/1934 | Heath |
| D169,007 S | 3/1953 | Lindberg et al. |

(Continued)

OTHER PUBLICATIONS

International Search Report (ISR) and Written Opinion from co-pending PCT application PCT/US2018/016928 dated May 16, 2018 (PCT/ISA/220 and PCT/ISA237)

*Primary Examiner* — Nathaniel E Wiehe
*Assistant Examiner* — Jackson N Gillenwaters
(74) *Attorney, Agent, or Firm* — Mark D. Miller

(57) ABSTRACT

The present invention provides support frames for positive pressure blowers having one or more wheels mounted at a lower corner of the frame, wherein the wheels are mounted to roll in a direction that is perpendicular to the flow of air through the blower. This sideways orientation of the wheels allows a frame carrying a blower to be easily moved from side to side, such as when placed into or removed from a side compartment on an emergency vehicle, and allows such a frame carrying a blower to be easily tilted, turned and rolled around at the scene of a fire in much the same manner as a wheelbarrow. Embodiments of the invention may include an upper handle or grip which allows a user to control the frames by tilting and rolling them around on the wheels. Embodiments of the invention may include a support bracket for holding a battery or other power supply.

22 Claims, 20 Drawing Sheets

(56) References Cited

U.S. PATENT DOCUMENTS

| | | | |
|---|---|---|---|
| D172,514 S | 6/1954 | Podall | |
| D181,083 S | 9/1957 | Wells | |
| D181,416 S | 11/1957 | Hweitt | |
| 2,830,779 A | 4/1958 | Wentling | |
| 2,868,558 A * | 1/1959 | Krauss | F04D 29/646 280/47.131 |
| 2,884,075 A * | 4/1959 | King | A62C 25/005 169/48 |
| 2,954,198 A | 9/1960 | Lindberg et al. | |
| D192,622 S | 4/1962 | Allen | |
| 4,239,459 A | 12/1980 | Felter | |
| 4,261,255 A | 4/1981 | Anderson et al. | |
| 4,657,478 A | 4/1987 | LaZebnik et al. | |
| 4,732,539 A | 3/1988 | Shin-Chin | |
| 4,906,164 A * | 3/1990 | Jackman | A62C 3/0207 416/246 |
| 4,932,628 A * | 6/1990 | Pacheco | B25H 1/0007 248/129 |
| 5,062,487 A | 11/1991 | Siria et al. | |
| D327,947 S | 7/1992 | Clark | |
| 5,205,711 A | 4/1993 | Raczykowski | |
| 5,395,087 A * | 3/1995 | VanBasten | A62C 3/0207 169/52 |
| 5,941,314 A * | 8/1999 | Weinmeister | A62C 8/00 169/48 |
| 6,347,922 B1 | 2/2002 | Wang | |
| 6,779,768 B1 | 8/2004 | Ferre | |
| D539,414 S | 3/2007 | Russak et al. | |
| D638,924 S | 5/2011 | Perez et al. | |
| D799,670 S | 10/2017 | McDonnel | |
| 10,029,131 B2 * | 7/2018 | Mueller | F04D 25/04 |
| 2005/0118022 A1 * | 6/2005 | Fu | F04D 25/06 416/63 |
| 2006/0115964 A1 | 6/2006 | Findikoglu et al. | |
| 2011/0293415 A1 | 12/2011 | He et al. | |
| 2016/0115964 A1 * | 4/2016 | Livingston | F04D 25/08 416/63 |
| 2016/0353951 A1 | 12/2016 | Buchanan et al. | |
| 2016/0354623 A1 | 12/2016 | Mueller et al. | |
| 2018/0045220 A1 | 2/2018 | He | |
| 2018/0266437 A1 * | 9/2018 | Seasholtz | F04D 19/002 |
| 2020/0208654 A1 * | 7/2020 | Weinmeister | F04D 19/002 |

* cited by examiner

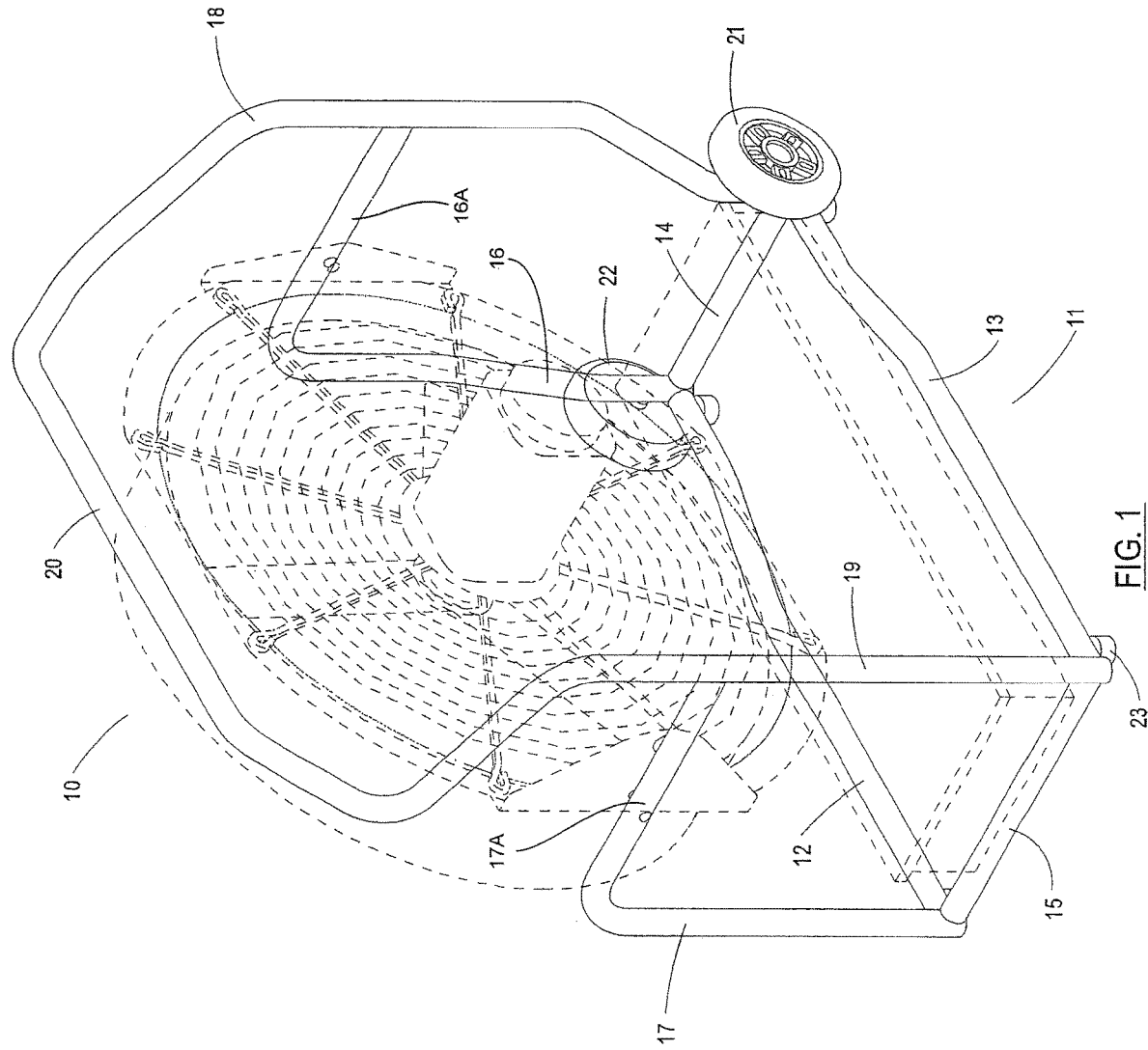

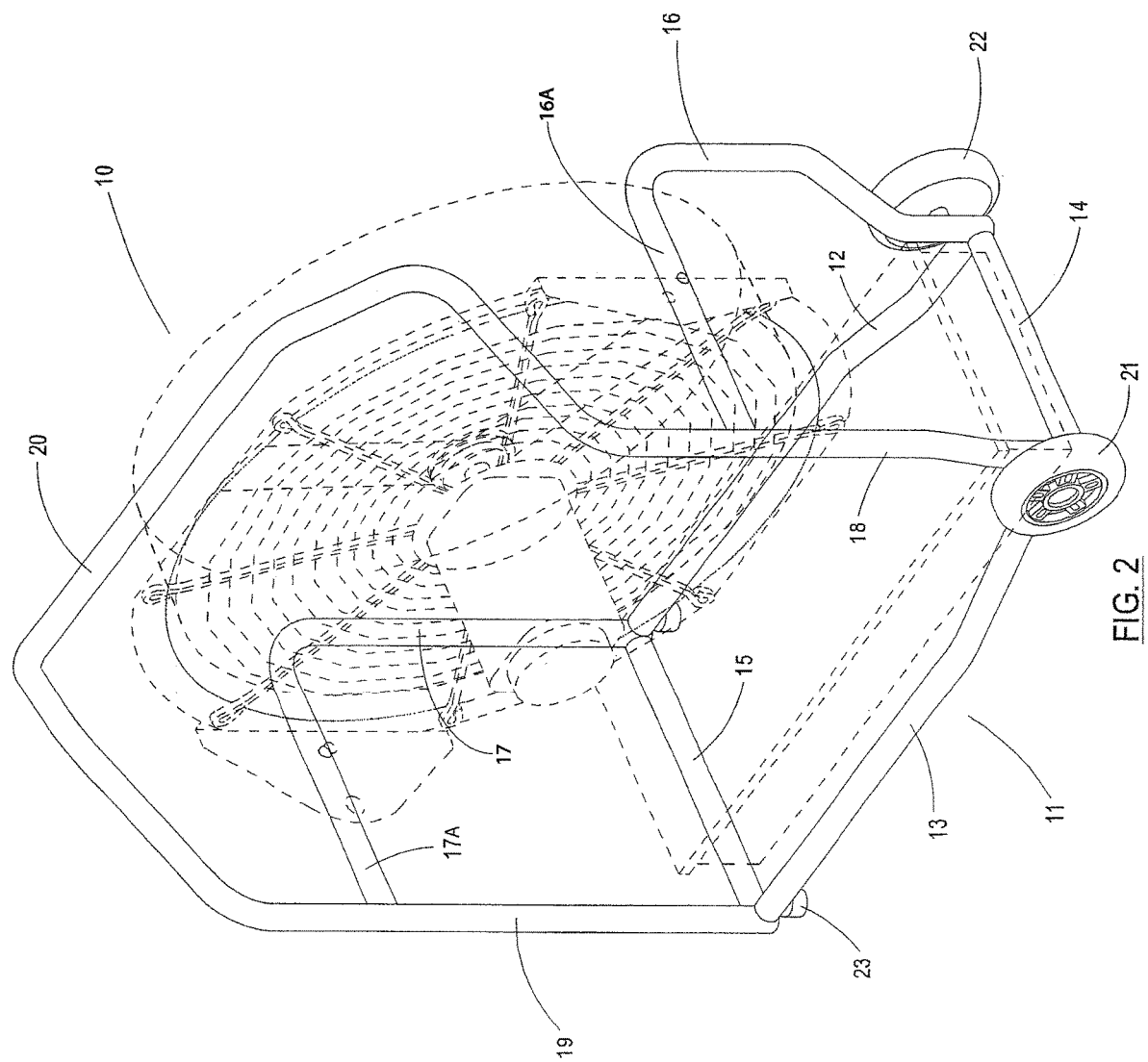

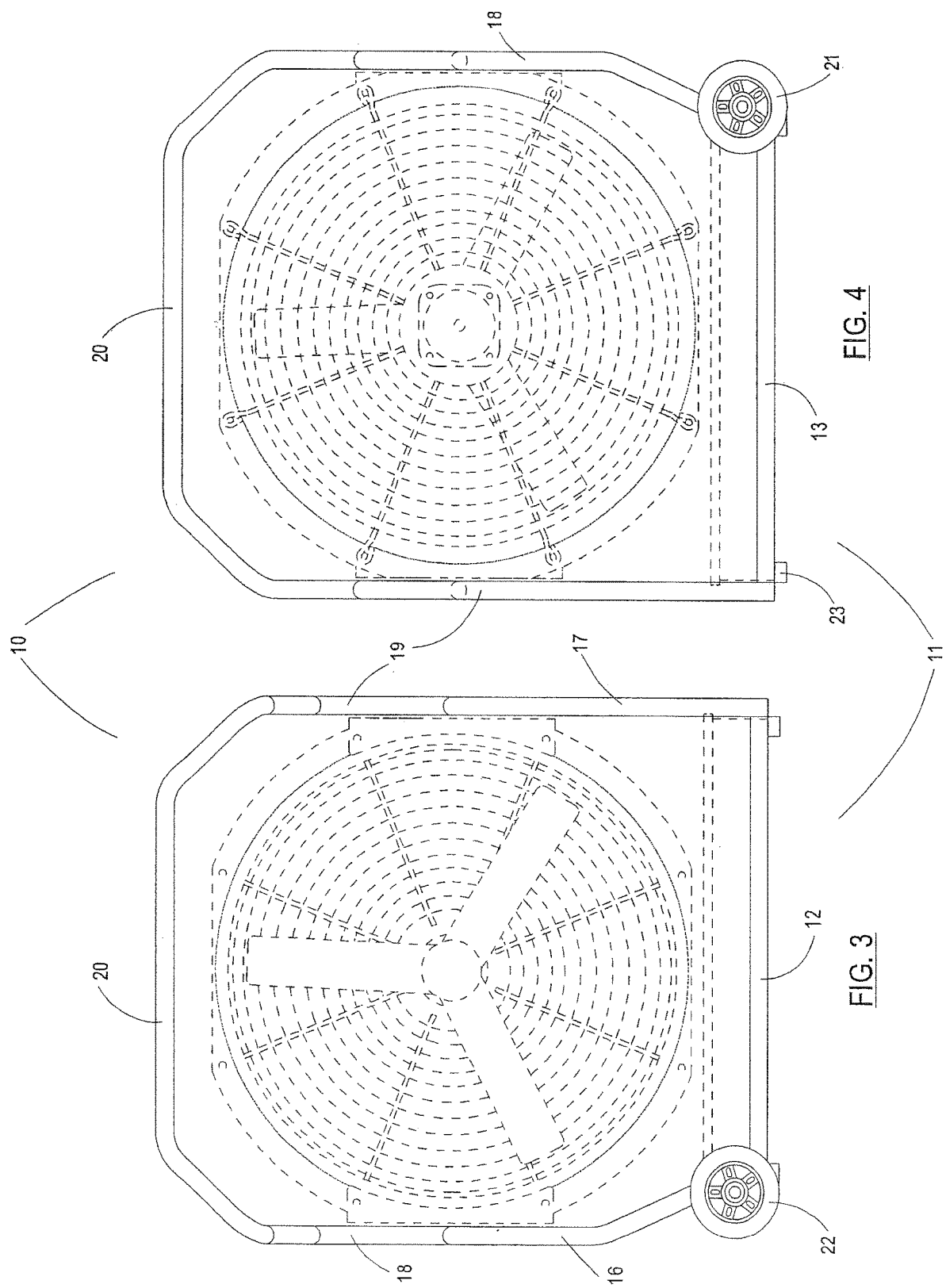

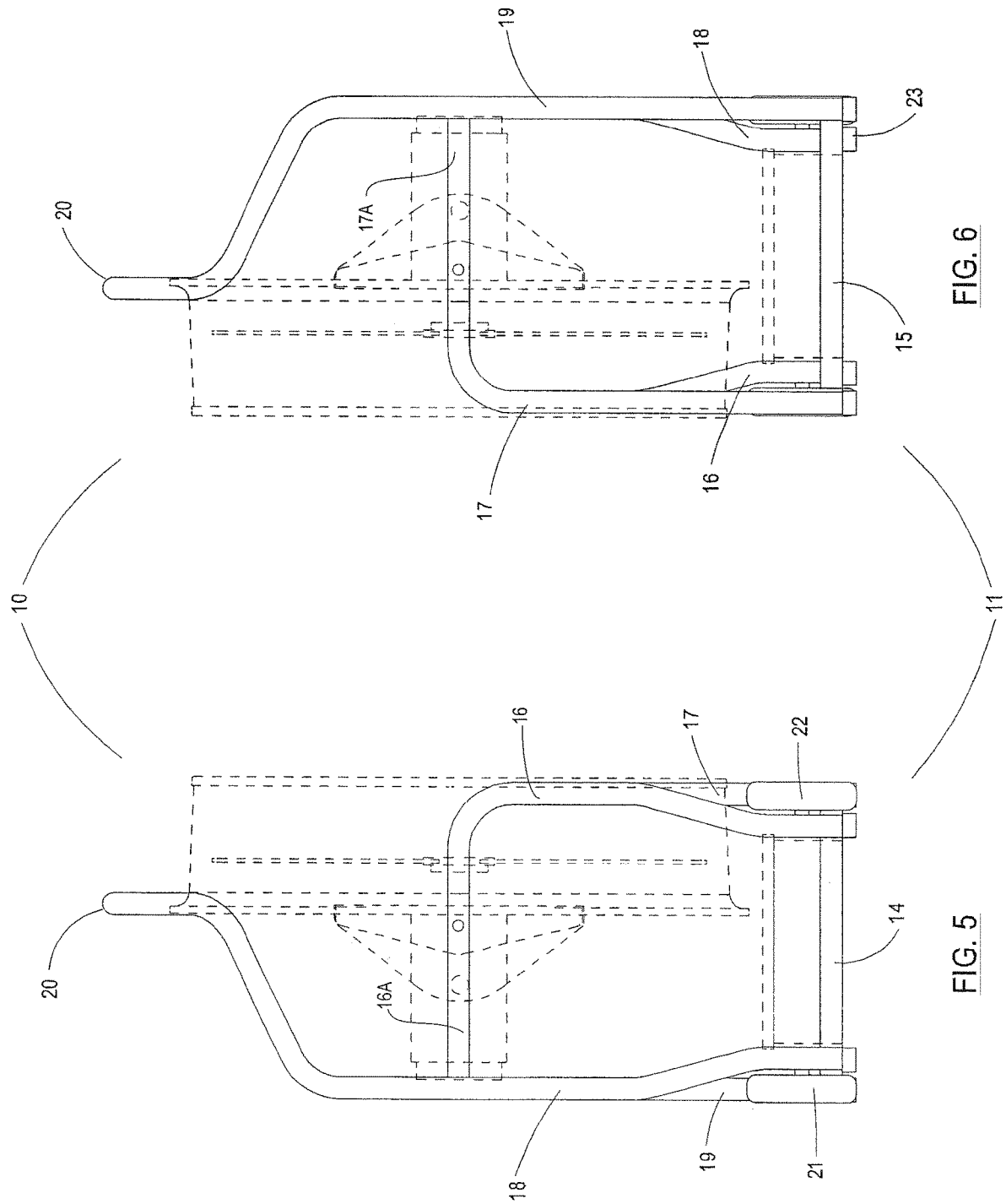

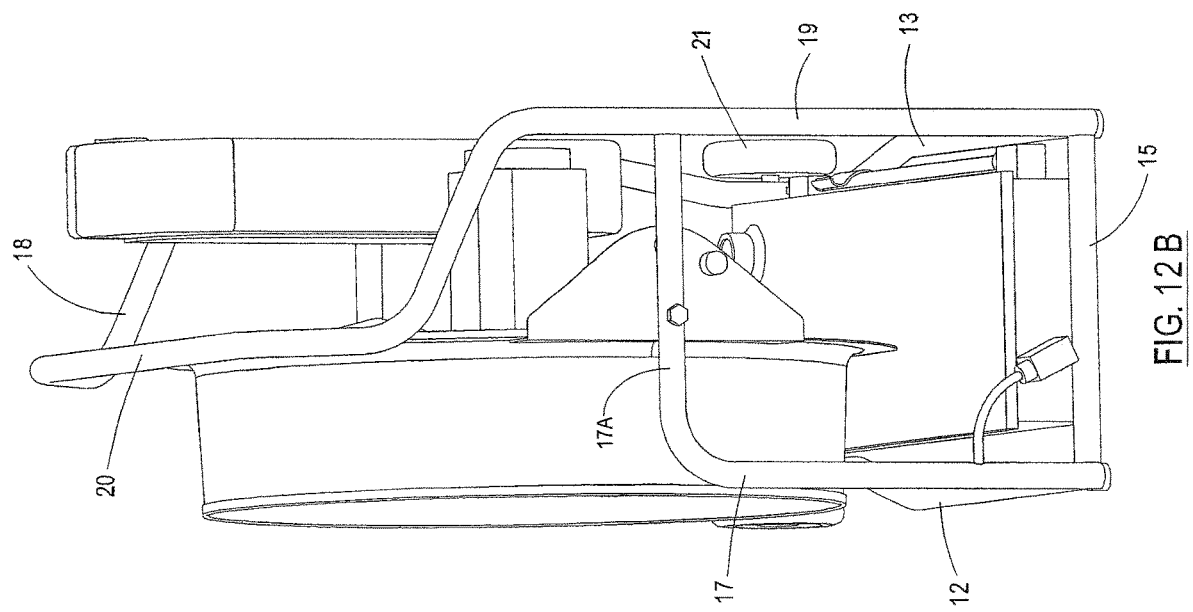

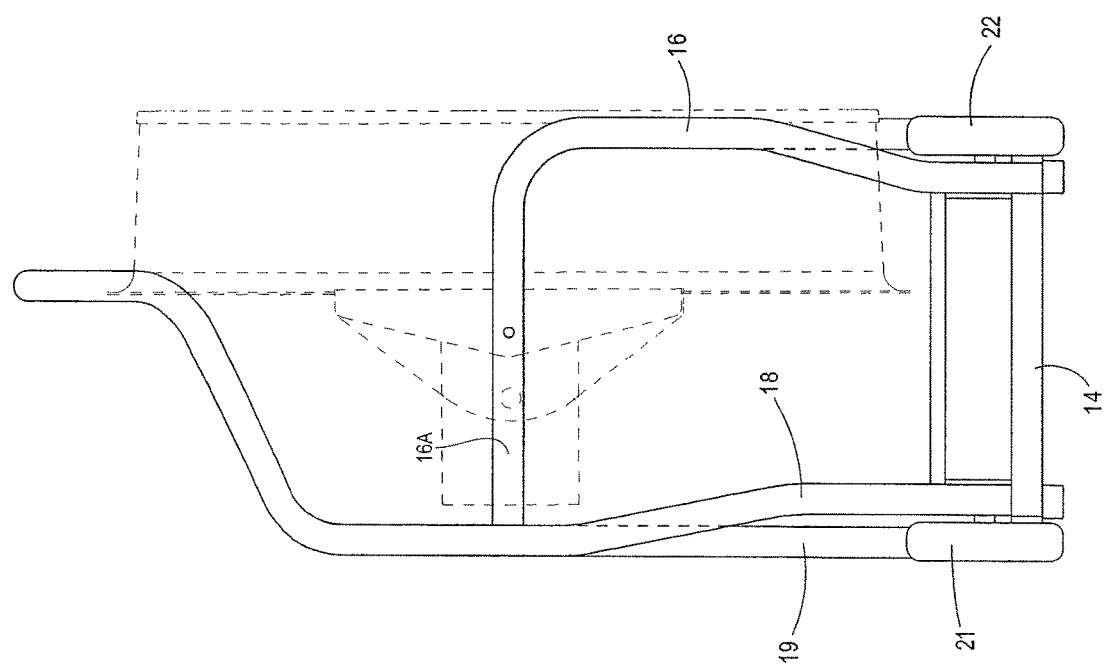

SUPPORT FRAME FOR POSITIVE PRESSURE BLOWER

PRIORITY CLAIM

This application is a non-provisional of and claims the benefit of U.S. Provisional Application No. 62/455,173 filed on Feb. 6, 2017, and is also a non-provisional of and claims the benefit of U.S. Provisional Application No. 62/563,583 filed on Sep. 26, 2017, both of which provisional applications are incorporated herein by this reference in their entireties.

BACKGROUND OF THE INVENTION

1. Field of the Invention

The present invention relates to firefighting equipment, and in particular to new and improved support frames for a positive pressure blower devices and related methods of use.

2. Description of the Prior Art

Modern techniques of fighting structural fires often involve the use of a positive pressure blower (fan) in order to remove smoke and provide ventilation inside burning buildings. The quick evacuation of smoke from a building decreases the potential for smoke damage, and improves visibility and breathing for fire fighters so that they may more efficiently and safely fight the fire.

Because of the unique circumstances in which positive pressure blowers are used, they require several critical features not found in ordinary house fans. In most cases, positive pressure blowers are transported in an emergency vehicle (e.g. a fire engine) which has side compartments for holding firefighting equipment. A typical compartment for holding a positive pressure blower may be narrow, tall and deep, and ordinarily closed with a tall, narrow door. Most positive pressure blowers include a wide fan mounted in a housing that is tall and narrow. The fan housing is usually mounted on a frame. As a result, positive pressure blowers are typically stored sideways in a storage compartment on an emergency vehicle.

Existing positive pressure blowers are provided with wheels that allow the blowers to be easily moved about at a fire scene. Such wheels are ordinarily oriented in parallel with the flow of air passing through the blower. This allows such a blower to be moved forward and backward while still pointing in generally the same direction. However, such blowers are not easily moved from side to side at a fire scene. In addition, blowers having wheels mounted for such forward-backward movement are not easily placed into or removed from side storage compartments on emergency vehicles. This is because the wheels are mounted perpendicular to the sideways movement needed to insert and remove the blower from the compartment. This can damage the wheels, and result in a waste of valuable time, since such a blower must be dragged out of the storage compartment before it can be used.

In addition to being strong, lightweight, and designed to fit into a compartment on a fire fighting vehicle, positive pressure blowers must also be portable. This means they must operate using gasoline, batteries, or some other portable power source.

It is therefore desirable to provide portable battery-operated positive pressure blowers and methods of use having a frame with wheels that are oriented perpendicular to the flow of air through the blower, so that the blower may be easily moved in a sideways fashion and may be quickly and easily placed into and removed from a compartment in the side of a firefighting vehicle.

The present invention provides such a method and apparatus, while at the same time providing additional useful features.

SUMMARY OF THE INVENTION

The present invention addresses the matters described above by providing support frames for positive pressure blowers having one or more wheels mounted at one or more lower corners of a frame, wherein the wheels are mounted to roll in a direction that is perpendicular to the flow of air through the blower. This sideways orientation of the wheels allows a frame carrying a blower to be easily moved from side to side, such as when placed into or removed from a side compartment on an emergency vehicle. This orientation makes the frame easier to roll into and out of a fire truck compartment, which is ergonomically better for firefighters by reducing the potential for lower back injuries.

Embodiments of the frames of the present invention may be provided in a generally box-like shape, defining at least two pairs of lower corners in the frame. In such embodiments, a pair of wheels are mounted in parallel to each other and perpendicular to the flow of air, at one of the pairs of lower corners of the frame, allowing the frame to be tilted upward so that all of the weight of the frame rests on these wheels. This allows the frame carrying the blower to be tilted and moved about in the same manner as a wheelbarrow. This wheel positioning makes it possible to move and turn the frame in any of a number of directions, facilitating easy positioning at a firefighting scene. In most embodiments, a handle, grip or extension is provided in an upper part of the frame to facilitate tilting and controlling the frame when it is being rolled from place to place. In some embodiments, the handle may be integrated into the frame such that it is not necessary to cause the handle to be flipped out for movement of the frame and flipped back for storage of the frame.

It is to be appreciated that embodiments of the frames of the present invention are designed to receive a positive pressure blower, such that the frames have a front, a back and sides defining an interior for receiving the blower. In most embodiments, the lower portion or base of the frame has a rectangular shape, such that a first wheel may be mounted at a lower corner on the front of the frame (e.g. right front), and a second wheel may be mounted in parallel at a corresponding lower corner on the back of the frame (e.g. right rear). This allows the frame to be tilted on its (right) side for support by said wheels. In such embodiments, additional wheels may or may not be provided on the opposite lower corners of the front and back of the frame (e.g. left front, left rear). If such additional wheels are provided, the frame may travel sideways on all four wheels. However, in most embodiments only one pair of wheels are provided, either on the front/back of the lower right corners, or the front/back of the lower left corners. In these embodiments, stops or stands are provided on the opposite lower corners of the front and back. Accordingly, in these embodiments the frame may only be rolled if it is tilted up on the set of wheels provided.

The upper portion of the frame may have different shapes in different embodiments, and is preferably designed to provide for easy grasping by a firefighter at a fire scene. For example and without limitation, a very simple embodiment may provide a generally cube-like structure having rectangular base, generally rectangular sides, and a generally rectangular top surrounding a blower mounted inside. One or more handles may be attached to or integrated into the top of the frame, and may extend out or up from the frame for easy grasping. However, in other embodiments, such as those illustrated herein, the back of the frame (or the front) may extend to a top portion having or defining a handle, and the front of the frame (or the back) may extend only part of the way to the top, defining an open space above this portion. Alternatively or in addition, the side(s) of the frame may extend fully or partially to the top. In such embodiments, the top portion of the front of the frame may be angled inward such that any grip or handle thereon is centrally located for easy grasping.

It is to be appreciated that the upper and/or lower portions of the frames of the present invention may be provided in a variety of different shapes and angles in order to facilitate mounting of different sizes and styles of blowers in the frames, and to provide one or more handles or grips in a convenient location for the user.

In some embodiments, one or more support brackets may be provided on the frames of the present invention to hold a power supply, such as a battery or battery pack for an electric blower, or a fuel tank for a gas-operated blower.

It is therefore an object of the present invention to provide support frames for positive pressure blowers having one or more sideways oriented lower wheels that allow the frames to be quickly and easily removed from a side compartment on an emergency vehicle.

It is also an object of the present invention to provide support frames for positive pressure blowers having one or more sideways mounted lower wheels thereon that allow the frames to be tilted and rolled around on the wheel(s) in much the same manner as a wheelbarrow.

It is also an object of the present invention to provide support frames for positive pressure blowers having a generally rectangular base with a pair of lower wheels mounted in parallel at lower corners thereof, and an upper portion having at least one handle or grip thereon which allows a user to grasp and control the frames by tilting and rolling them around on the wheels.

It is also an important object of the present invention to provide support frames as described herein for use with battery operated positive pressure blowers.

Additional objects of the invention will be apparent from the detailed descriptions and the claims herein.

BRIEF DESCRIPTION OF THE DRAWINGS

FIG. 1 is a right rear perspective view of an embodiment of the present invention showing a blower in phantom lines.

FIG. 2 is a left rear perspective view of the embodiment of FIG. 1.

FIG. 3 is a front elevational view of the embodiment of FIG. 1.

FIG. 4 is a rear elevational view of the embodiment of FIG. 1.

FIG. 5 is a left side elevational view of the embodiment of FIG. 1.

FIG. 6 is a right side elevational view of the embodiment of FIG. 1.

FIG. 12B is an opposite side view of the embodiment of FIG. 12A.

FIG. 22 is a left side view of the embodiment of FIG. 20

DETAILED DESCRIPTION

Figure 8:
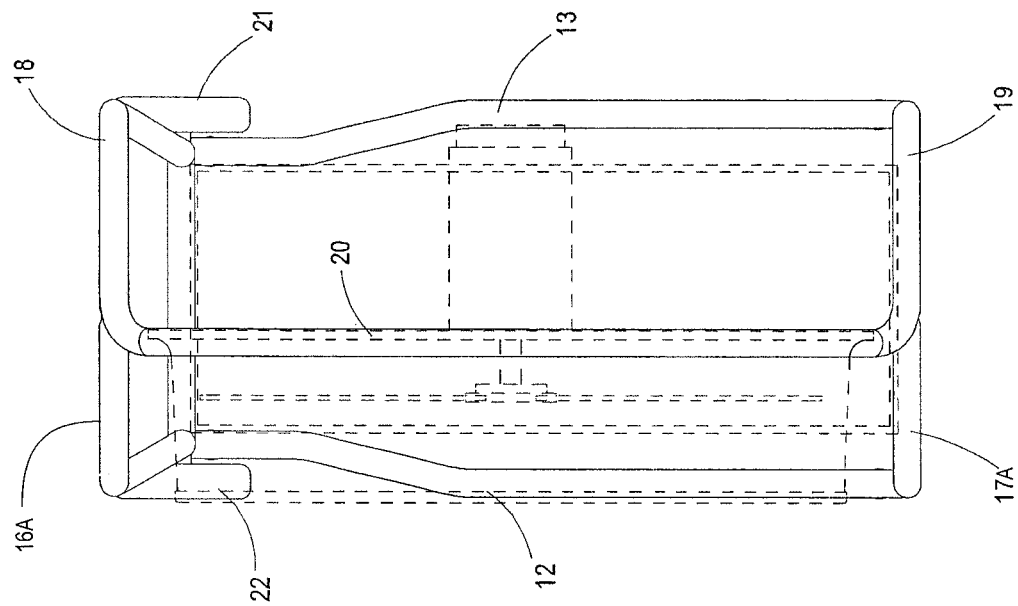
FIG. 8 is a top plan view of the embodiment of FIG. 1.
Figure 7:
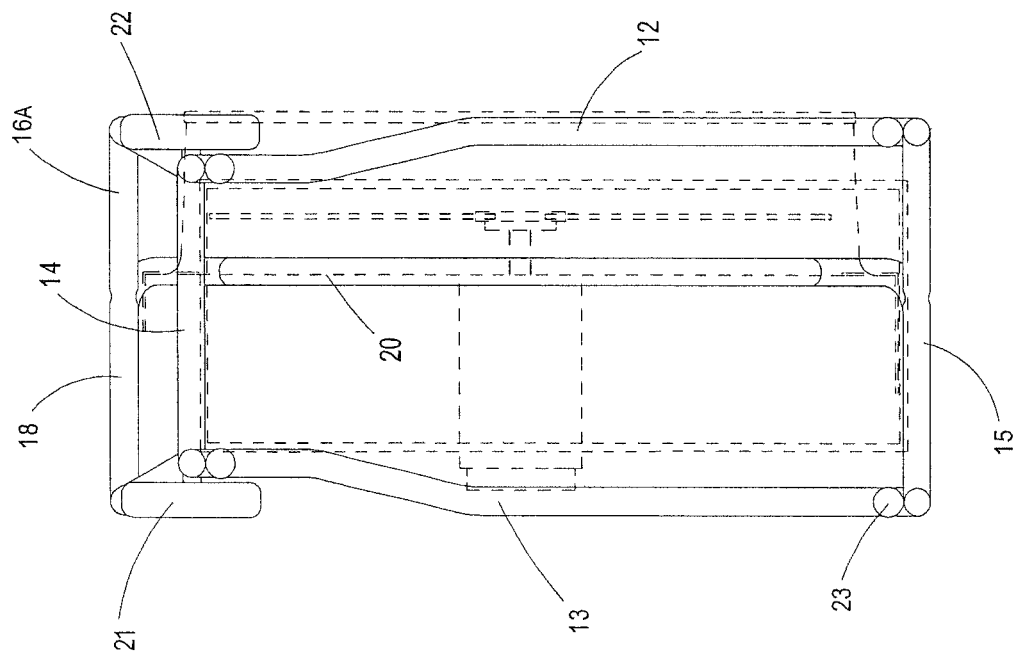
FIG. 7 is a bottom plan view of the embodiment of FIG. 1.
Figure 9:
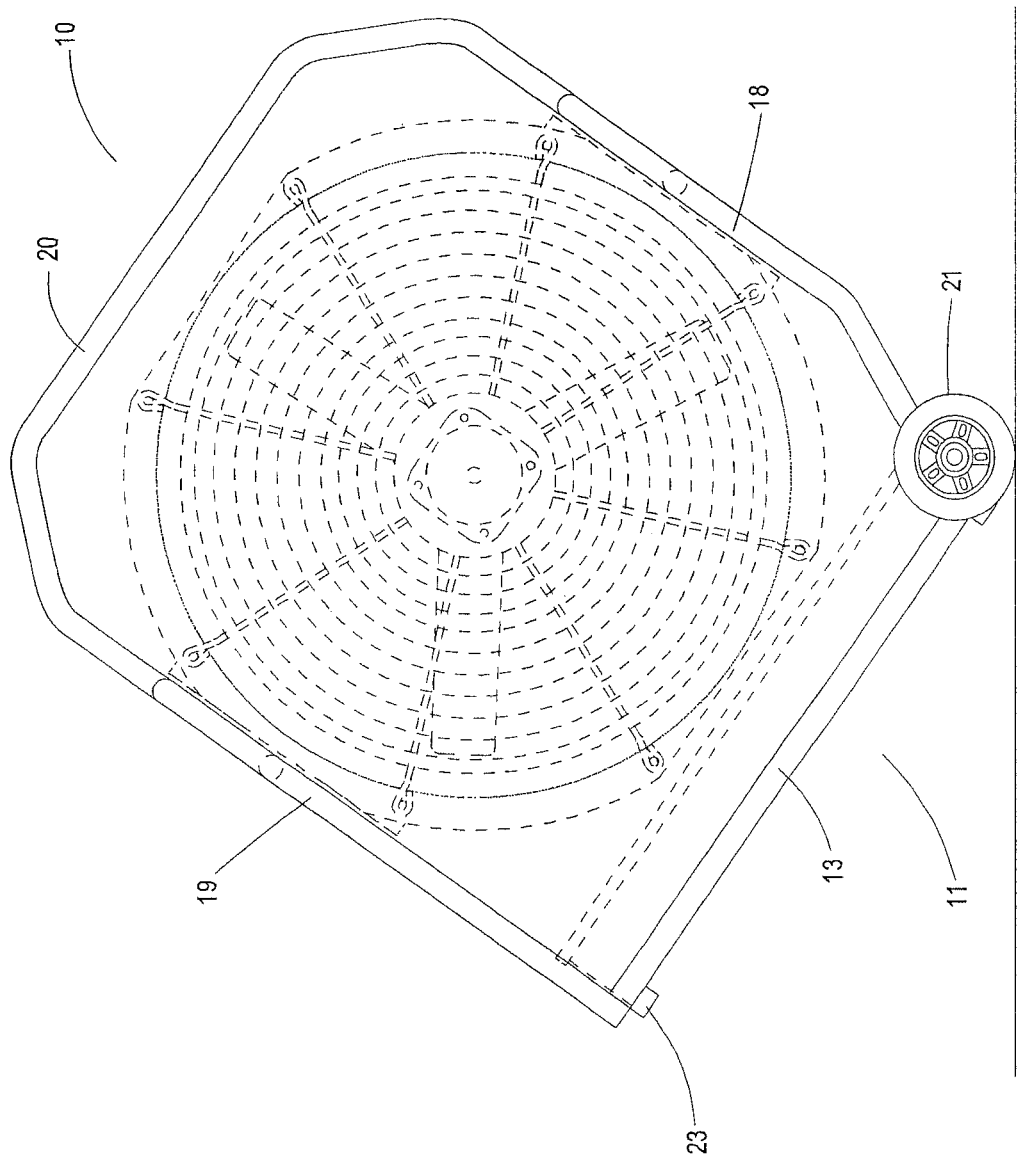
FIG. 9 is a tilted rear elevational view of the embodiment of FIG. 1.

Referring to the drawings wherein like reference characters designate like or corresponding parts throughout the several views, and referring particularly to FIGS. 1-2, it is seen that this illustrated embodiment of the invention includes a support frame 10 made up of elongated sturdy members, preferably made of metal (such as, without limitation, aluminum, steel or the like), although embodiments may be made of other rigid and sturdy materials such as, without limitation, plastic or acrylic. It is important that the material from which members of the frame are made may be attached or adhered to each other, and that they allow mounting features to be provided for supporting a positive pressure blower. Solid or tubular materials may be used, or other strong structures such as I-beams.

The exemplary frame of the present invention shown in FIGS. 1-9 of the illustrations has a lower generally rectangular base 11 made up of a front member 12, rear member 13, side member 14 and opposite side member 15. In the illustrated embodiment of FIGS. 1-9, front and rear members 12 and 13 are generally parallel to each other; and side members 14 and 15 are generally parallel to each other, and generally perpendicular to the front and rear members. The illustrated base 11 therefore forms four distinct corners. In the embodiment of FIGS. 1-9, a pair of rotatable wheels 21 and 22 are provided in parallel to each other, and generally parallel to front/back members 12 and 13, which is perpendicular to the flow of air through the blower. In this embodiment, wheels 21 and 22 are located at generally opposite ends of side member 14, at lower corners of the base 11. In the embodiment of FIGS. 1-9, wheels 21 and 22 are attached to upper members 16 and 18, but in other embodiments, the wheels could be attached to front and back members 12 and 13, or they could be attached to side member 14. In some embodiments it is to be appreciated that side member 14 may act as an axle for wheels 21 and 22. It is to be appreciated that in other embodiments, wheels 21 and 22 may be located at generally opposite ends of side member 15, at other lower corners of the base 11. In such embodiments, wheels 21 and 22 may be attached to front and back members 12 and 13, but in other embodiments, the wheels could be attached to upper members 17 and 19, or they could be attached to side member 15. In some embodiments it is to be appreciated that side member 15 may act as an axle for wheels 21 and 22.

In the illustrated embodiment of FIGS. 1-9, only two wheels are provided at generally opposite ends of side member 14; and one or more non-movable feet or stops 23 are provided underneath base 11 at generally opposite ends of the opposite side member 15. It is to be appreciated that in other embodiments, wheels 21 and 22 may be located at generally opposite ends of side member 15, and one or more non-movable feet or stops 23 are provided underneath base 11 at generally opposite ends of the opposite side member 14. In some embodiments additional stops 23 may also be provided adjacent to the wheels and side member 14, to provide more secure footing when the frame is not being moved. Instead of being separate structures, stops 23 may be provided in the form of lower extensions of one or more of the upwardly extending members 16-19 described more fully below. In other embodiments, a second set of wheels may be provided at generally opposite ends of side member 15 instead of stops 23, in addition to a first set of wheels at generally opposite ends of side member 14.

In the illustrated embodiment of FIGS. 1-9, a set of four generally upwardly extending members 16-19 are provided, one at each corner of base 11. These upwardly extending members may or may not be straight, and may extend partially or fully to a top of the frame. In some embodiments, the upwardly extending members may all be the same length, and may connect to an upper rectangular structure having a size and shape similar to the base 11. Additional members or handles (not shown) may be attached to or integrated into such an upper structure to allow the frame to be grasped and manipulated. In some embodiments, such as those of the exemplary illustrations of FIGS. 1-9, some of the upwardly extending members may extend part-way to the top, while others may extend fully to the top. Referring to FIGS. 1 and 2, it is seen that in this embodiment, two front members 16 and 17 extend upwardly from the opposite ends of base member 12, member 16 extending from the corner of 12 and 14, and member 17 extending from the corner of 12 and 15. Also in this embodiment, two rear members 18 and 19 extend upwardly from the opposite ends of base member 13, member 18 extending from the corner of 13 and 14, and member 19 extending from the corner of 13 and 15.

Figure 10:
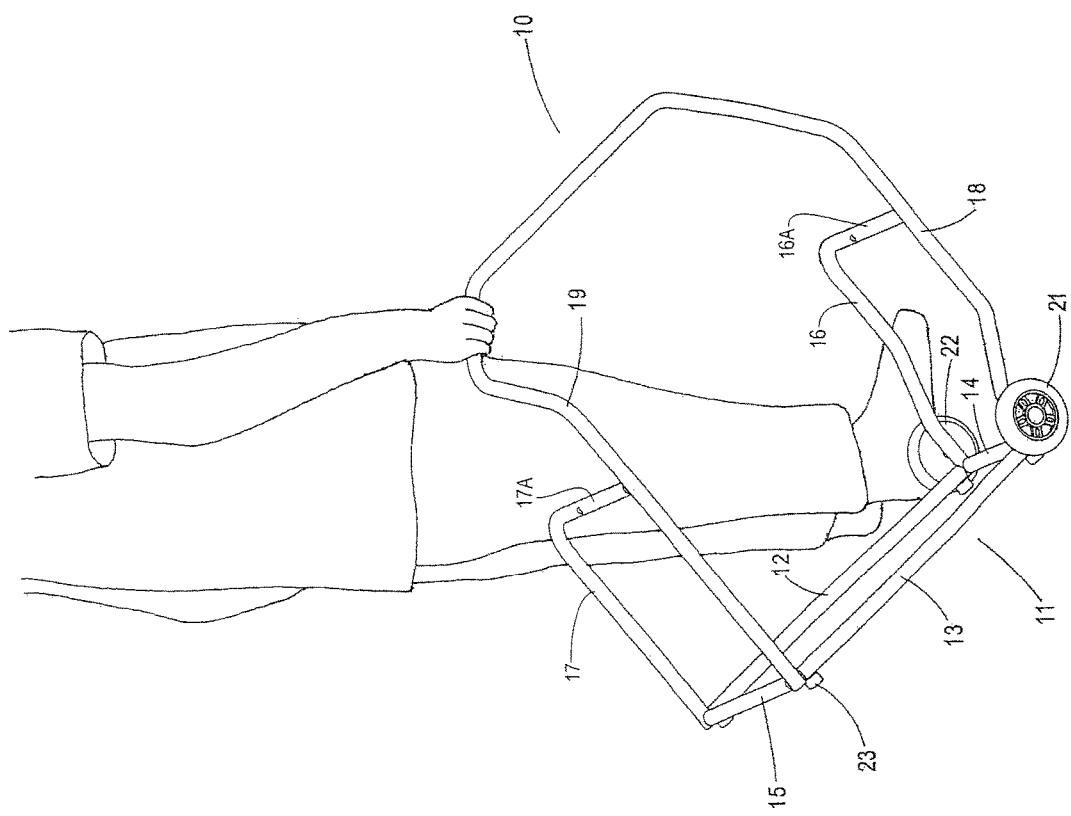
FIG. 10 is a perspective view of an embodiment of the present invention with no blower.
Figure 11:
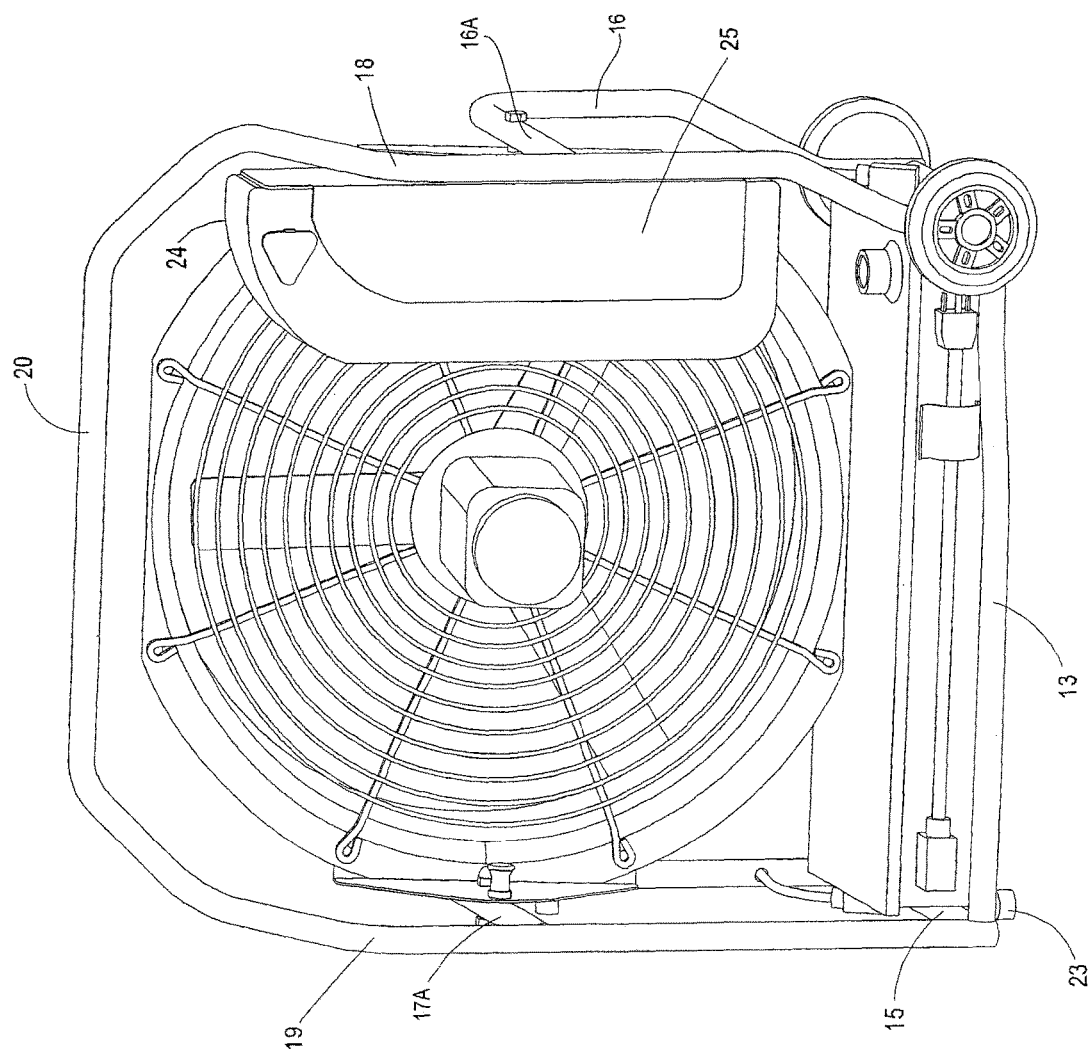
FIG. 11 is a front view of an embodiment of the present invention with a blower mounted therein.
Figure 12A:
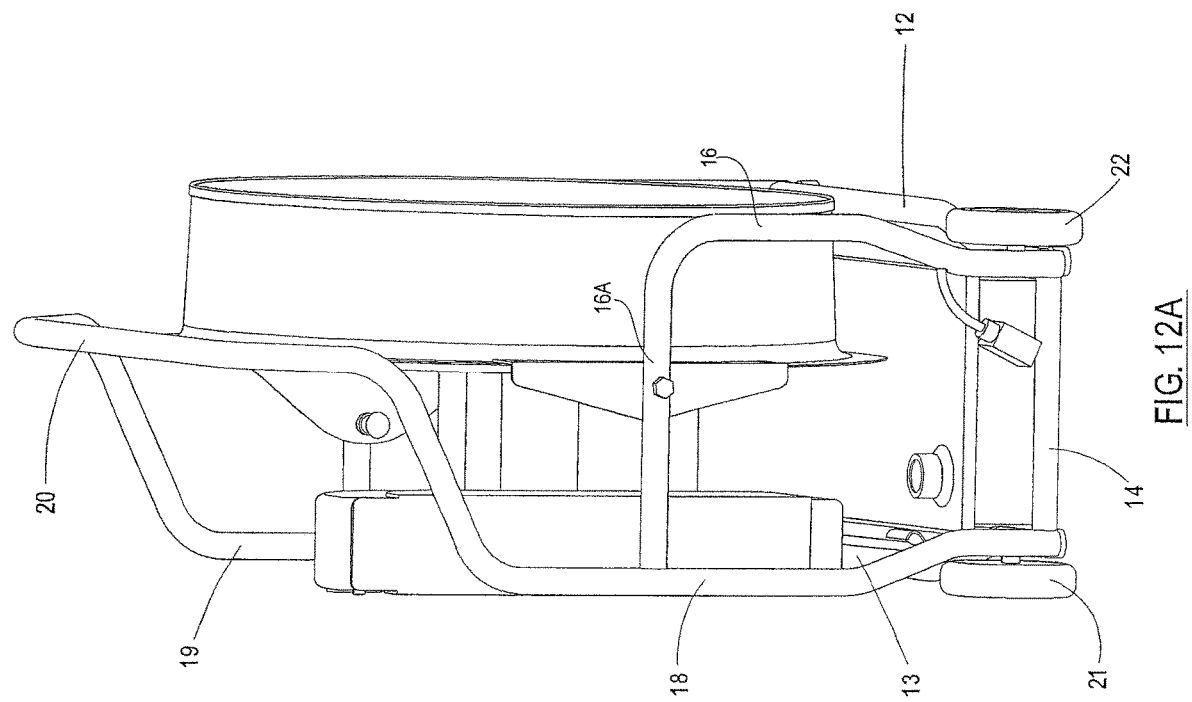
FIG. 12A is a side view of an embodiment of the present invention with a blower mounted therein.

In the illustrated embodiment of FIGS. 1-9, upwardly extending front members 16 and 17 extend part way up, and are then angled or bent to form cross members 16A and 17A such that they extend across the frame and attach to rear members 18 and 19. However, in this embodiment, rear members 18 and 19 extend further in an upwardly direction and are then angled such that they connect to each other forming an upper cross member 20. Cross member 20 is designed to be available for grasping by a firefighter in order to manipulate the frame (see FIG. 10), and may be located in any suitable location, such as directly above lower member 13; or in a mirror image embodiment, directly above lower member 12. In the embodiment of FIGS. 1-9, members 18 and 19 are angled such that member 20 extends across a central portion of the frame, and is not directly above lower member 12 or 13. Another embodiment may be a mirror image of the illustrated embodiment. It is to be appreciated that numerous other configurations for a cross member 20 may be provided, including without limitation, a diagonally oriented cross member attached to upper members 16 and 19, or to upper members 17 and 18. It is also to be appreciated that one or more handles (not shown) may be attached to or incorporated into cross member 20, or to any of the upwardly extending members to allow manipulation of the frame.

It is to be appreciated that in other embodiments, the base may have a non-rectangular shape (e.g., members 12, 13, 14 and 15 may or may not be straight), so long as at least one wheel (preferably two) may be mounted in the vicinity of one or more lower corners thereof. Although it is preferred that a rectangular base be provided with four upwardly extending members, it is to be appreciated that in other embodiments less than four upwardly extending members may be provided on a rectangular base, and a base having fewer than four corners may be provided. For example and without limitation, rear members 18 and 19 may both be provided, along with cross member 20, but only one of front members 16 or 17 may be provided. This would leave an open corner in the frame that would facilitate, for example, receipt of a large or oversized positive pressure blower.

In another example, without limitation, base 11 may be triangularly shaped such that wheels 21 and 22 are provided across from each other along a first cross member, and that two other cross members extend away at an angle connecting to each other, forming a base with three corners. In other embodiments, a triangular base may have only one wheel at the pointed end, with no wheels at a wider end, giving it both a shape and functionality very similar to that of a wheelbarrow. In such embodiments, up to three upwardly extending members may be provided, extending from one or more of the corners of the base, each upwardly extending member having appropriate lengths and angles to support a positive pressure blower.

It is to be appreciated that the spacing, positioning and angles of the base and of the upwardly extending members may be adjusted in order to provide support for different positive pressure blowers of different sizes and shapes.

Figure 13:
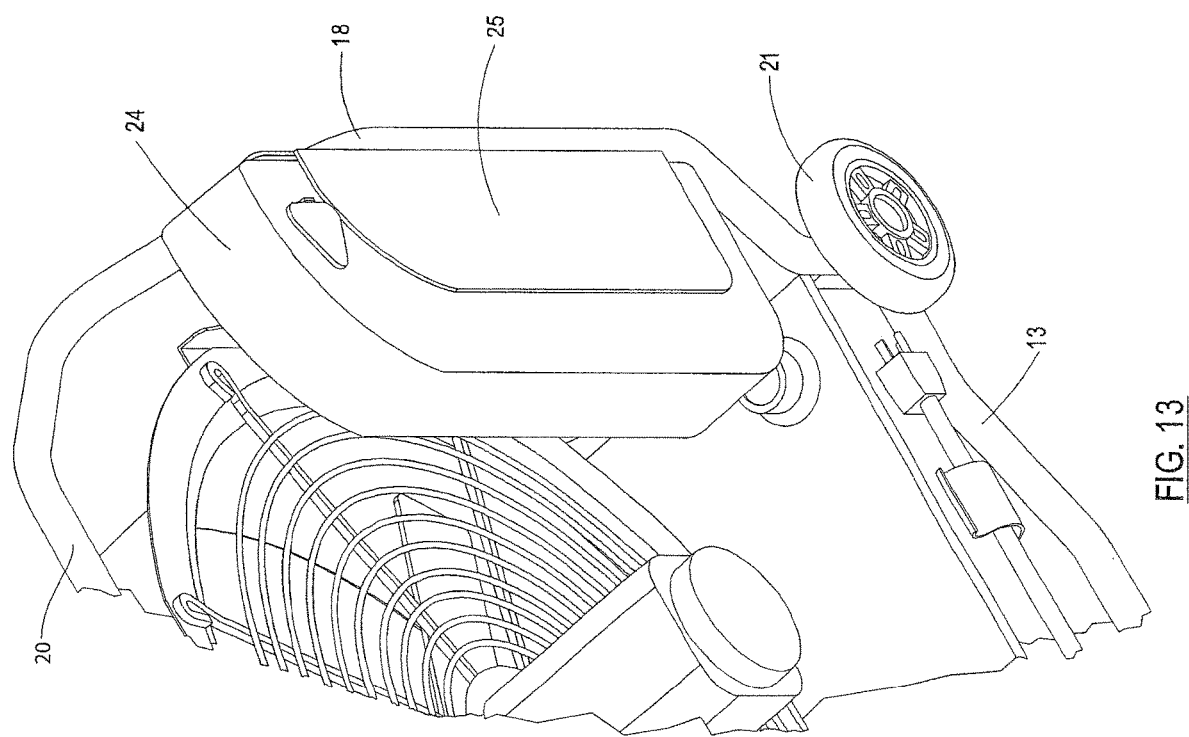
FIG. 13 is a close up view of an embodiment of a power supply of an embodiment of the present invention.
Figure 14:
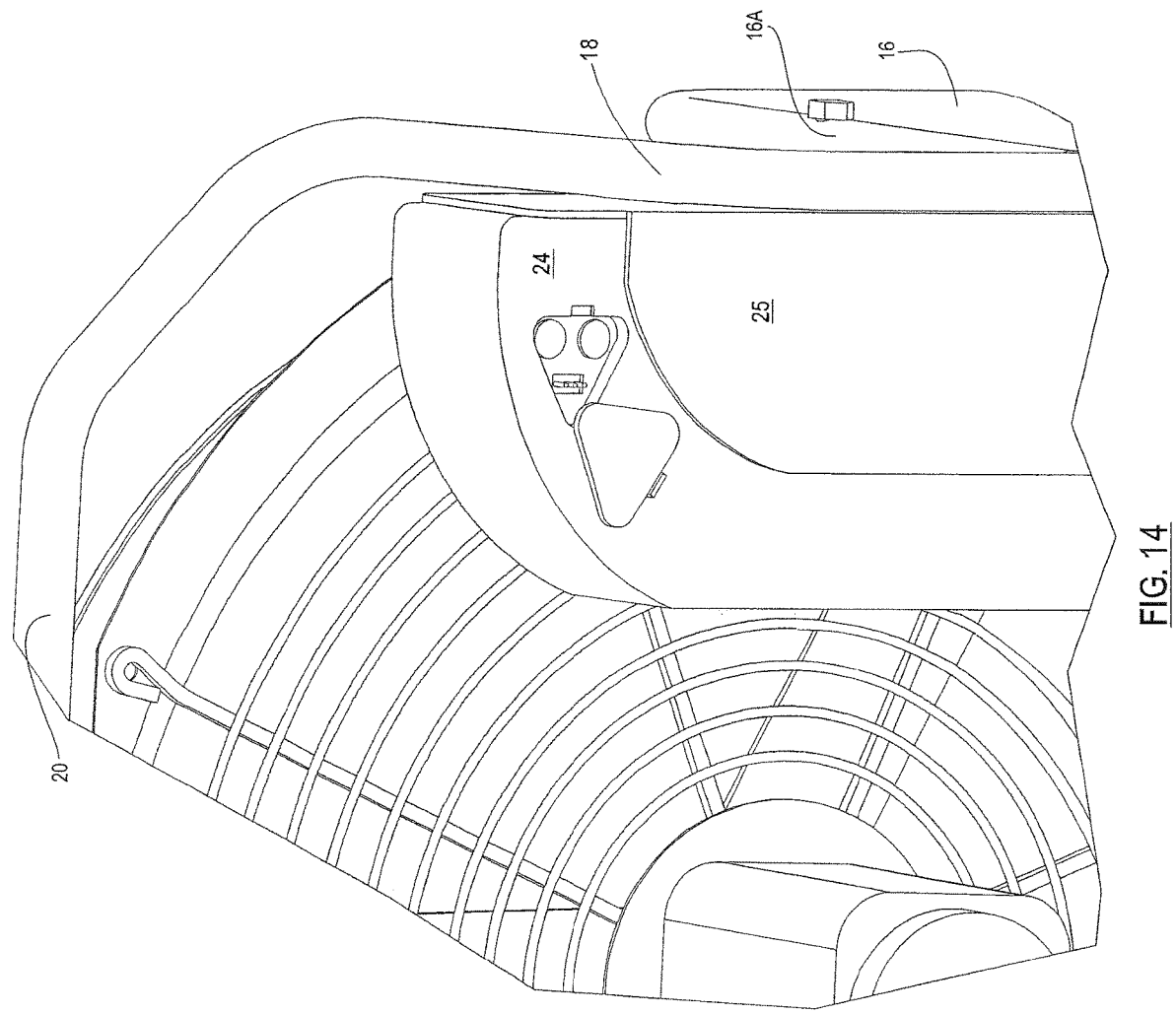
FIG. 14 is a different close up view of an embodiment of a power supply of an embodiment of the present invention.
Figure 15:
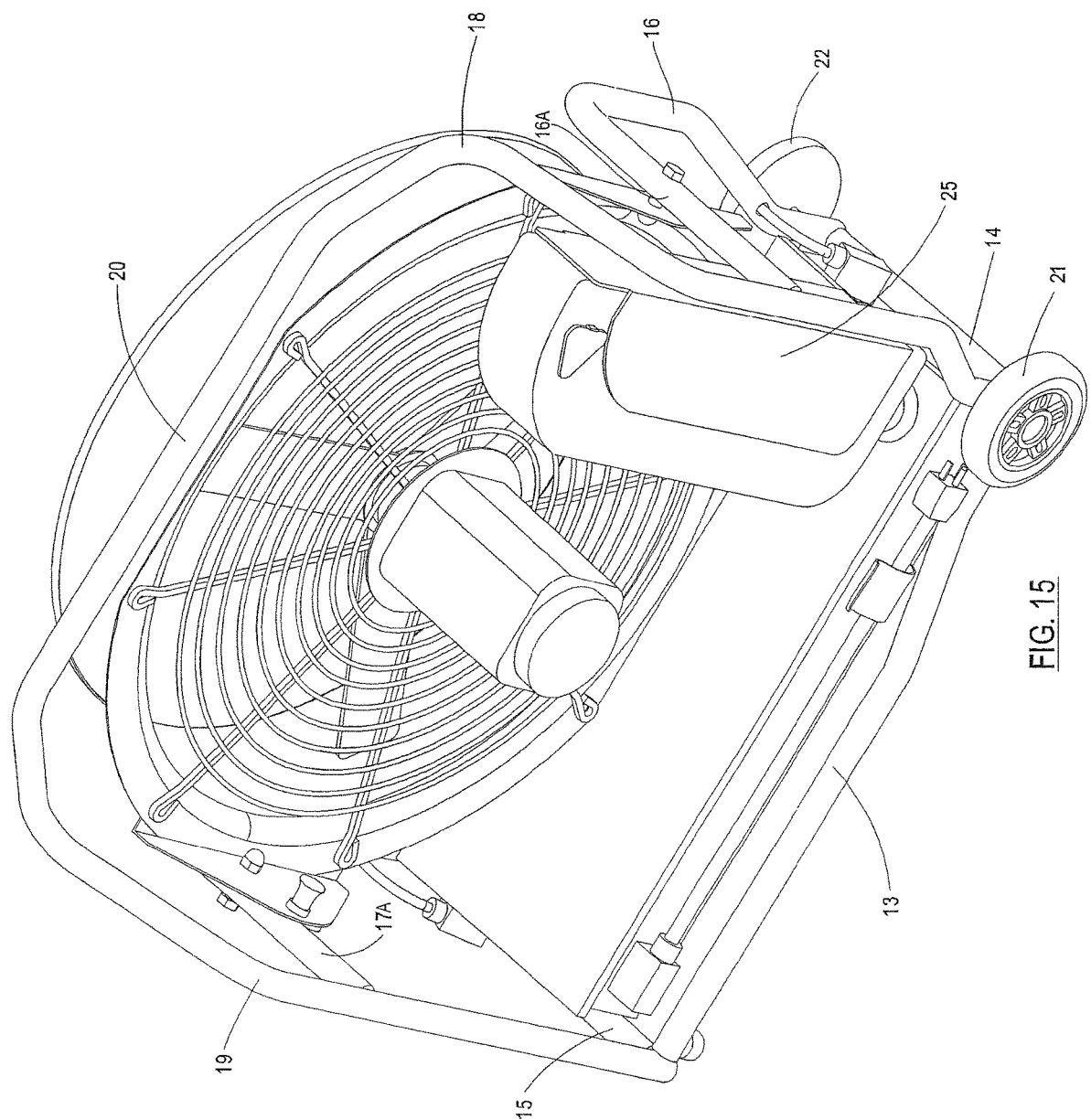
FIG. 15 is a perspective view of an embodiment of the present invention with a blower and power supply mounted therein.
Figure 16:
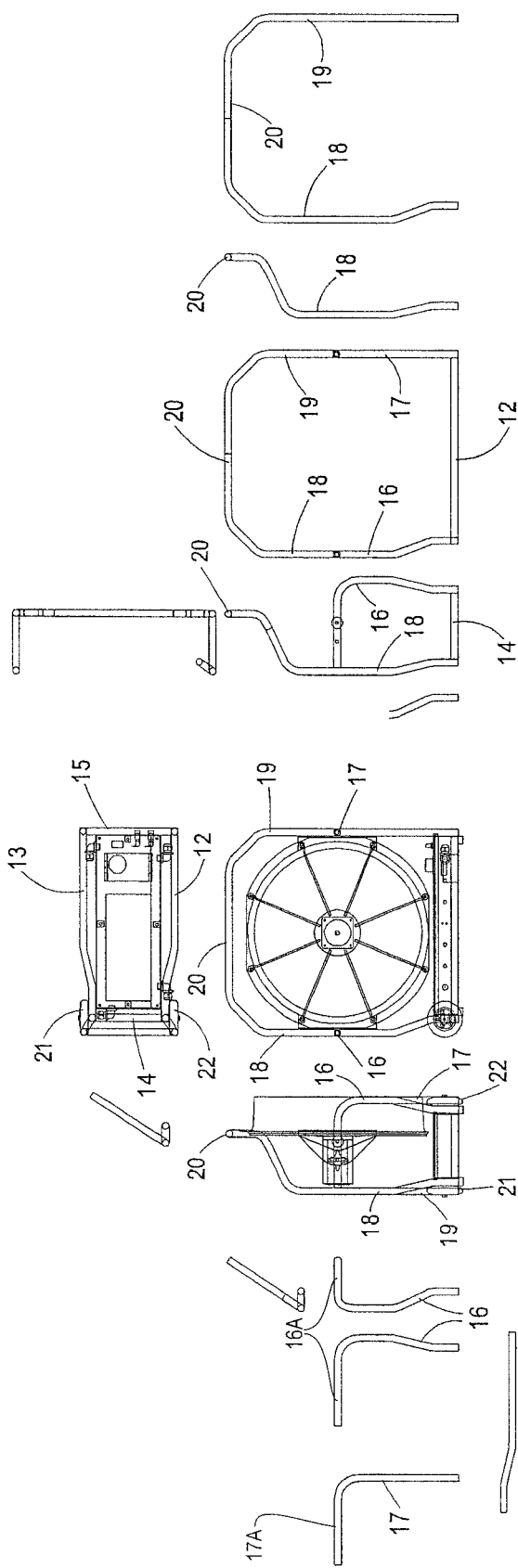
FIG. 16 is a set of schematic drawings for an embodiment of the present invention.

In some embodiments, a support bracket for a power supply such as a battery pack may be provided on the base or on an upwardly extending member. In the illustrated exemplary embodiment of FIGS. 11-15, a bracket 25 is provided on upwardly extending member 18 for supporting a power supply such as battery unit 24, as shown in FIGS. 13 and 14. The exemplary bracket illustrated in FIGS. 11-14 includes a back portion that may be attached to member 18, and two flanges, one on either side of the back portion, defining an interior region in the illustrated bracket assembly 25 for receiving a battery unit 24. Controls for such a battery unit 24 including on/off, USB port and power level indicator are shown in FIG. 14.

Figure 17:
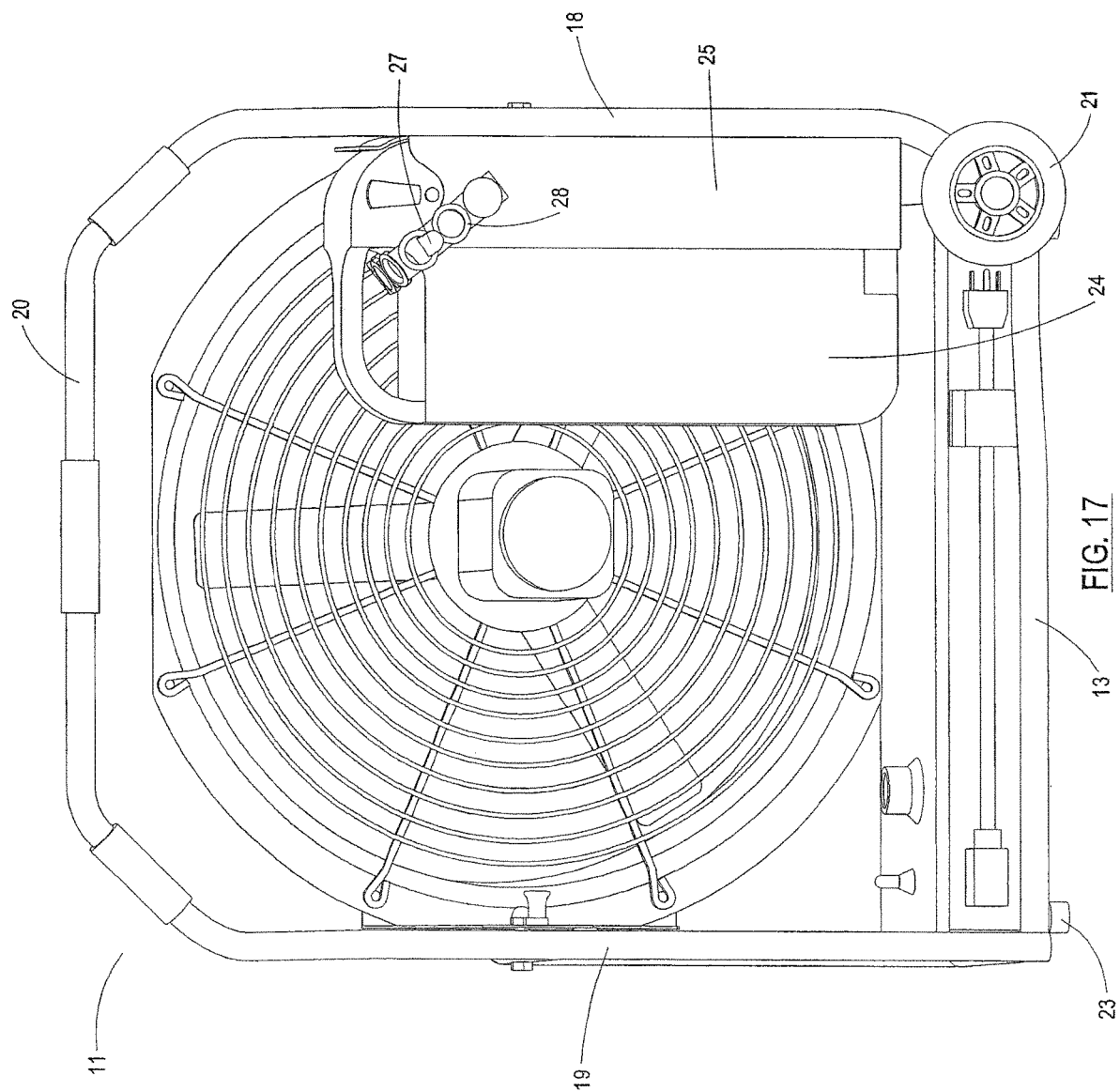
FIG. 17 is a side view of an alternative embodiment of the present invention showing a blower and alternative power supply support, with a battery mounted therein.
Figure 18:
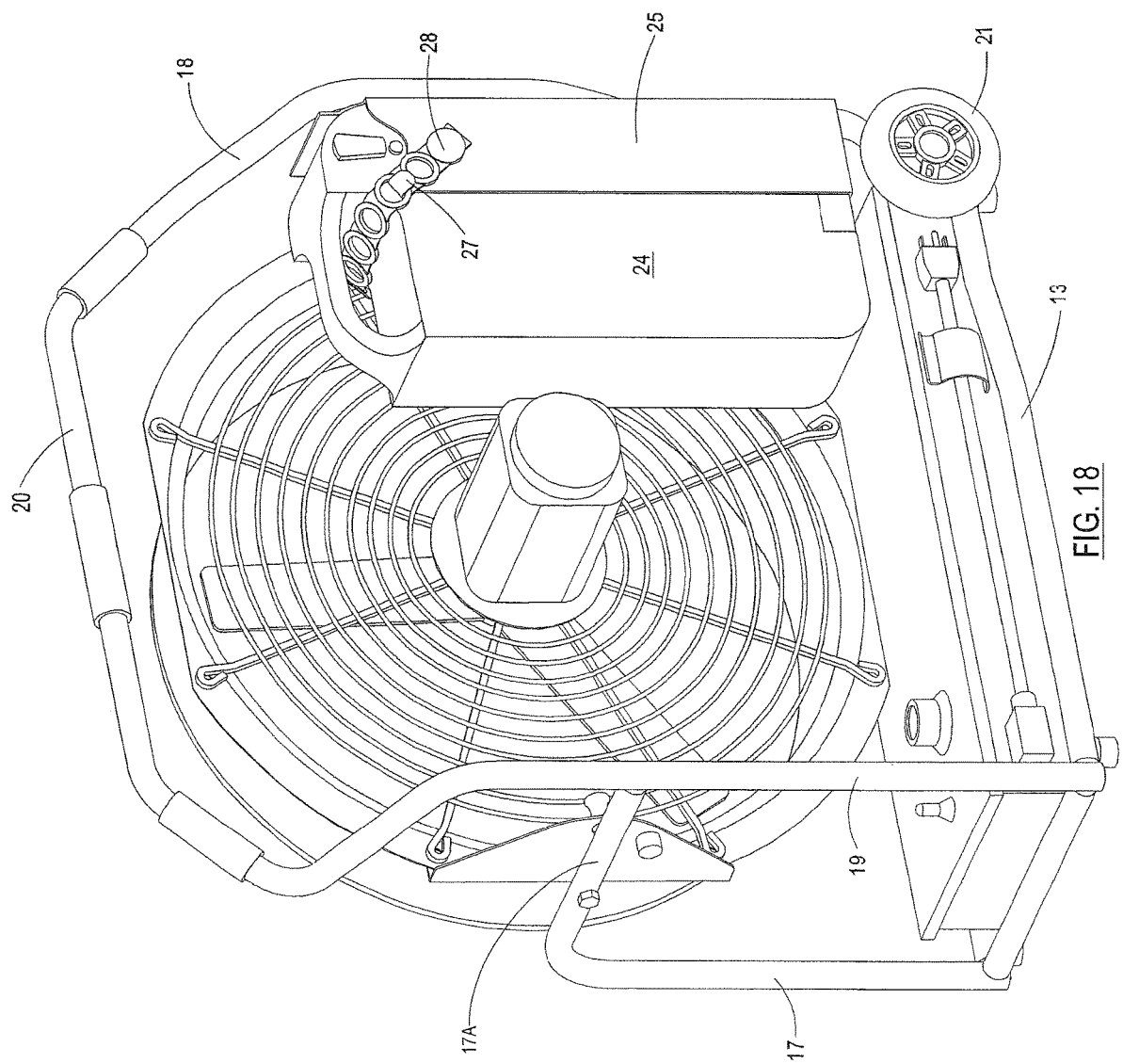
FIG. 18 is a perspective view of the embodiment of FIG. 17 showing detail of the alternative embodiment of the power supply support, with an embodiment of a battery mounted therein.
Figure 19:
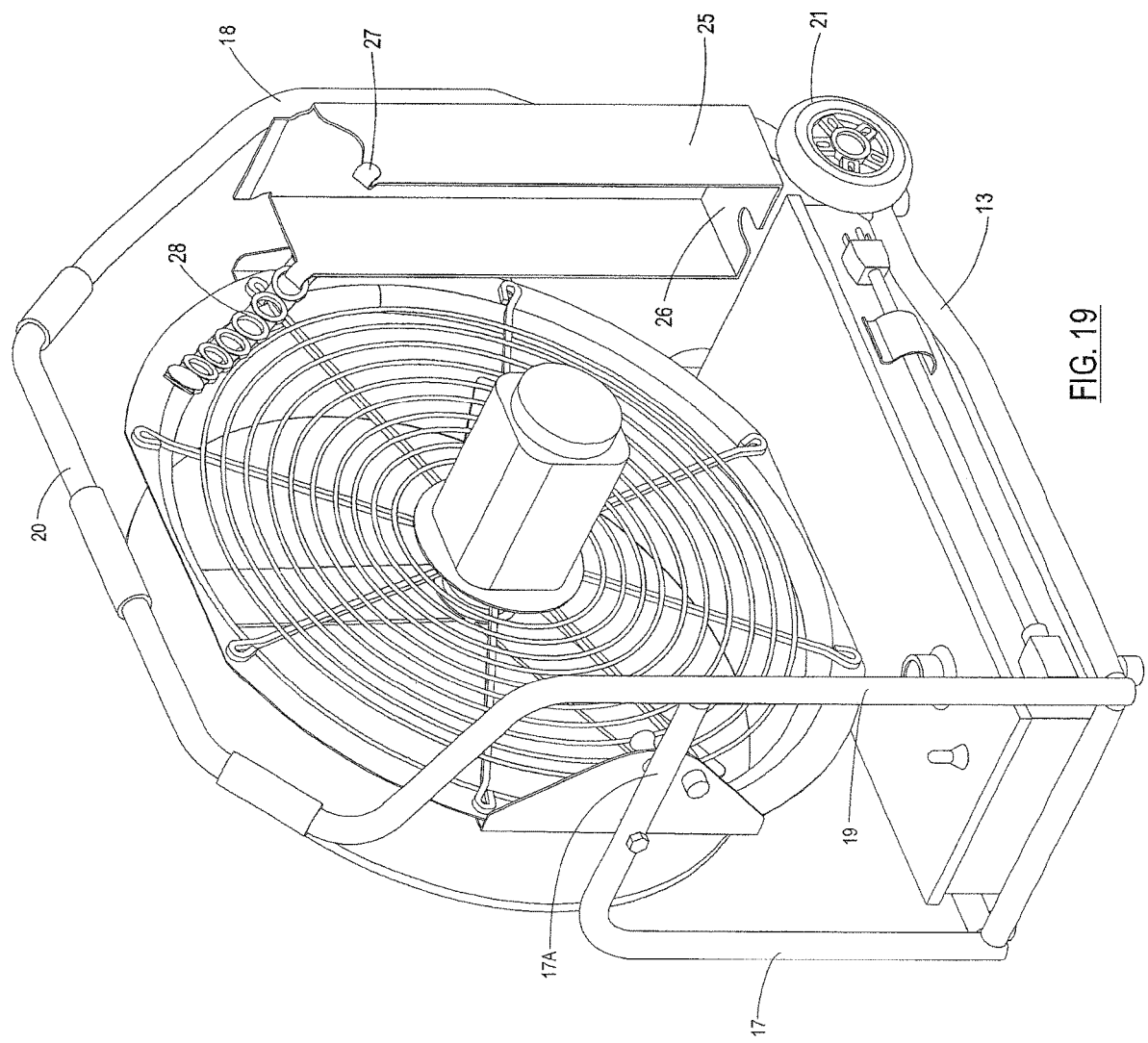
FIG. 19 is a perspective view of the embodiment of FIG. 17 showing detail of the alternative embodiment of the power supply support, with no battery mounted therein.
Figure 20:
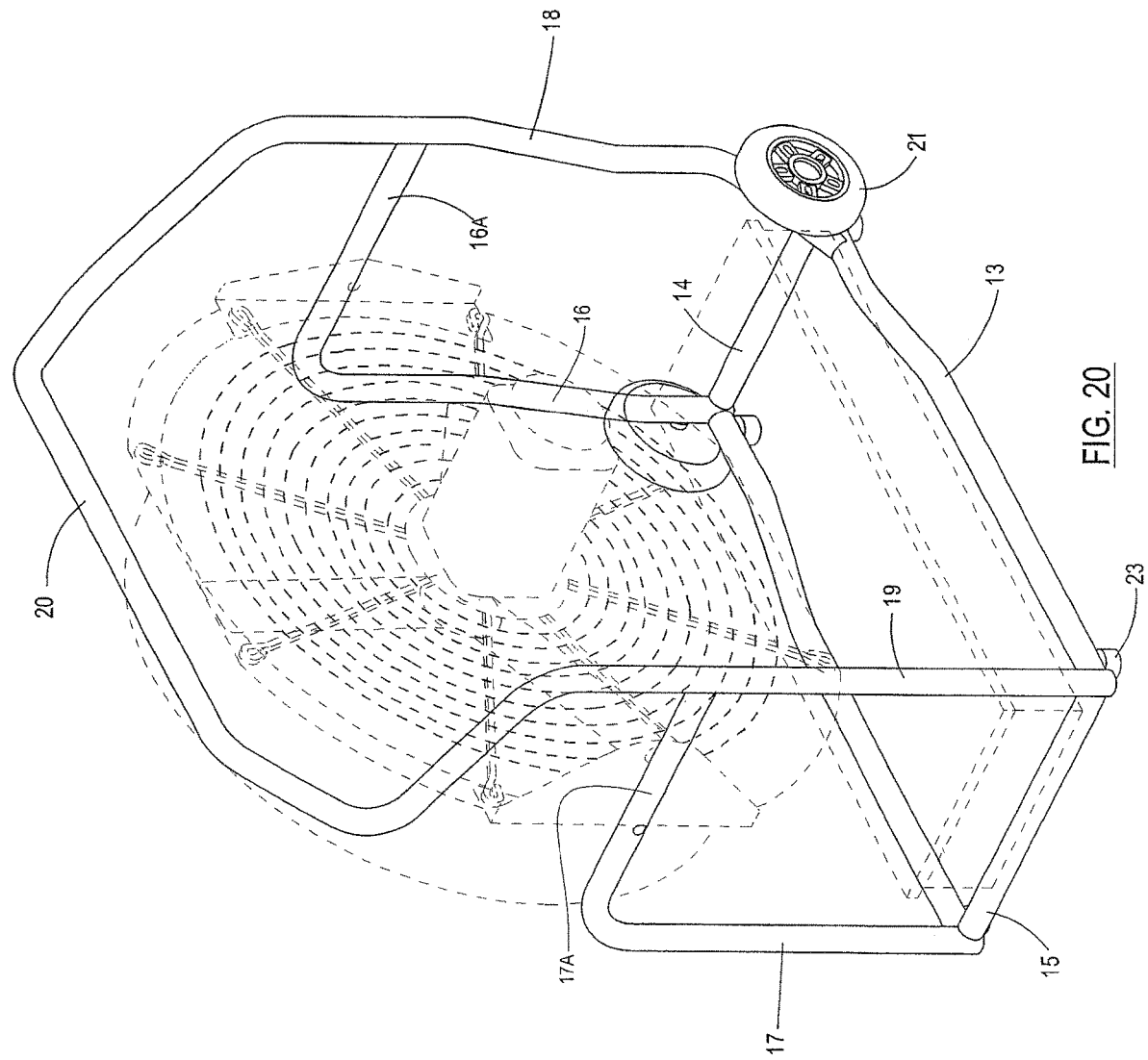
FIG. 20 is a rear perspective view of the embodiment of FIG. 17 without the power supply or power supply support.
Figure 21:
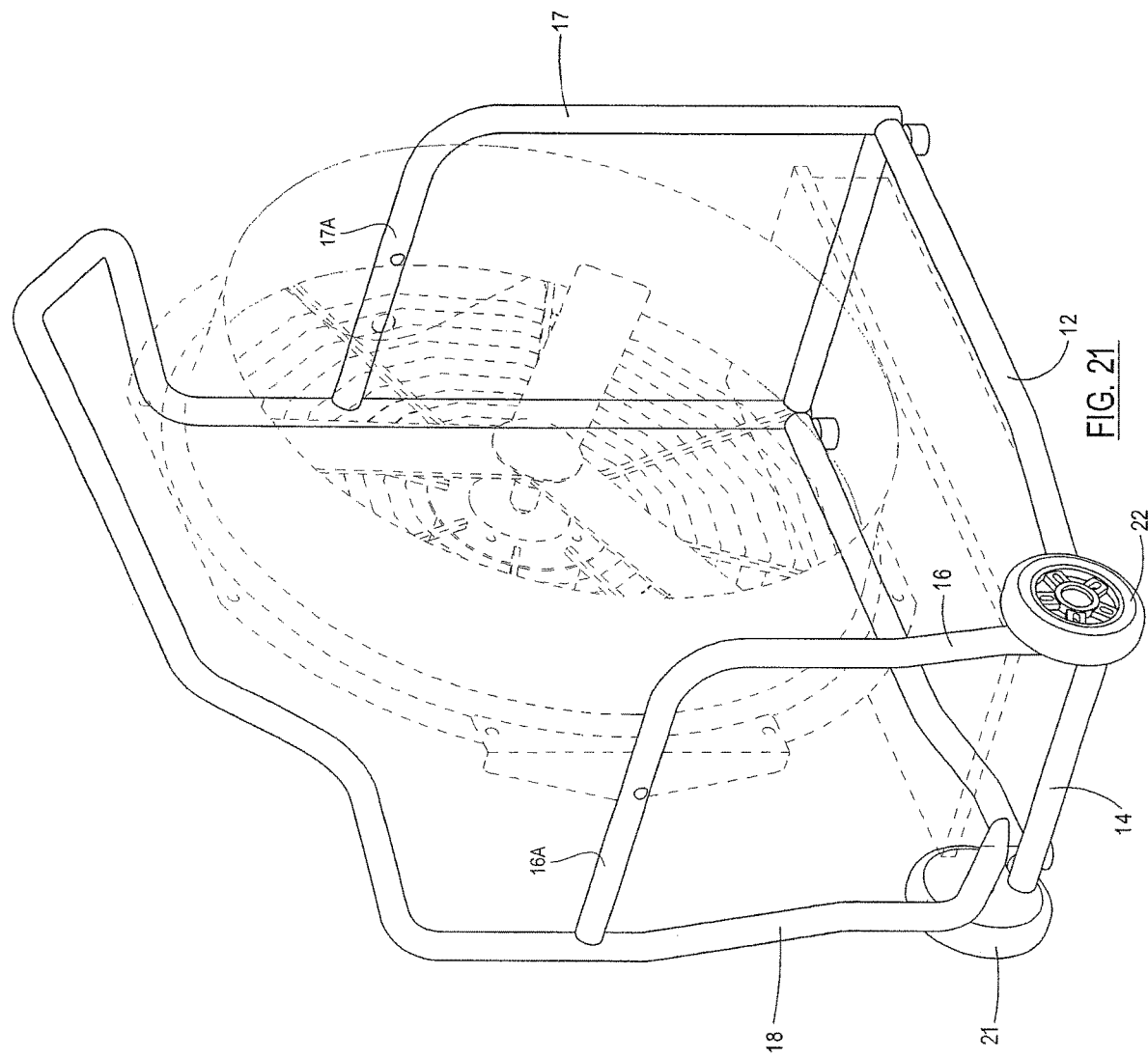
FIG. 21 is front perspective view of the embodiment of FIG. 20.

In an alternative embodiment shown in FIGS. 17-19, it is seen that a bottom tray 26 may be provided as part of a power supply support bracket 25 to provide additional support for various battery units 24 having different sizes and shapes. The exemplary bracket illustrated in FIGS. 17-19, includes a back portion that may be attached to member 18, and two flanges, one on either side of the back portion, and a bottom tray 26 defining an interior region in the illustrated bracket assembly for receiving a power supply such as battery unit 24.

As shown in FIGS. 17-19, a pair of tabs or lips 27 may be provided on each of the side flanges of bracket 25 for engagement with a strap 28 which may be used to help secure a battery unit 24 into bracket 25. Tabs 27 may be curved or folded back against the sides of bracket 25 as shown in FIG. 19 to help prevent strap 28 from becoming dislodged, thereby helping to secure the battery unit 24. Strap 28 may be made of a strong but stretchable material such as neoprene, rubber other suitable elastic material, such as, without limitation, a bungee cord.

In the alternative embodiment illustrated in FIGS. 17-22, it is seen that the upper member 18 has been modified to accommodate a different style power supply 24 utilizing a larger bracket 25 with bottom tray 26. In this embodiment, upper member 18 is angled outward near wheel 22, and bends out a location that is farther upward (compare FIG. 5 to FIG. 22). It is to be appreciated that upward member 18, as well as upward members 16, 17 and 19 may each be provided in different shapes or lengths, and/or with different angles in order to accommodate larger or smaller blowers, larger or smaller power supplies, etc. It is also to be appreciated that all of base members 12-15 and frame members 16-19 may be provided in different shapes or lengths, and/or with different angles to provide an overall profile for the entire unit that may be larger or smaller in order to be suitable for fitting the entire unit into a particular emergency vehicle compartment.

One or more openings, bolt holes, fasteners or other mounting devices may be provided in one or more of the various members of the frame for use in attaching a positive pressure blower to the frame. The locations, sizes and shapes of these mounting devices may vary according to the particular blower to be mounted on the frame. Further support structures and brackets may be provided to hold any wires, tubes, controls or adjustment devices associated with the and/or power supply blower in use.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A support frame for a positive pressure blower comprising:
    a. a generally rectangular base comprising two generally parallel elongated front and rear support members, and two generally parallel left and right side support members said side support members being generally perpendicular to said front and rear support members, wherein ends of said front and rear support members are attached to ends of said left and right support members forming four corners;
    b. four upwardly extending support members, each such member having one end attached to and extending from each of said four corners of said base;
    c. at least two wheels mounted at two of said corners at opposite ends of one of said side members such that said wheels rotate in parallel to said front and rear members, wherein one of said wheels is mounted flush against said front support member and the other of said wheels is mounted flush against said rear support member; and
    d. at least one cross member attached to and extending between two of said upwardly extending members.

2. The support frame of claim 1 further comprising a pair of stops provided underneath said base across from each other at the two corners near the side member opposite from said wheels.

3. The support frame of claim 1 further comprising a second set of wheels provided in parallel to said front and rear members, and along said base across from each other at the corners near the side member opposite from said first set of wheels.

4. The support frame of claim 1 further comprising a plurality of mounting members for attaching a positive pressure blower to said frame.

5. The support frame of claim 1 further comprising a support bracket mounted on said frame for holding a power supply.

6. The support frame of claim 5 wherein said support bracket comprises a back, two sides and a bottom defining an interior region for receiving said power supply.

7. The support frame of claim 6 wherein said support bracket further comprises a pair of tabs, one tab on each of said sides, for receiving ends of a flexible strap to hold said power supply in said support bracket.

8. The support frame of claim 2 wherein the upwardly extending support member attached at the right front corner of said base is bent to form a first cross member that engages a midpoint of the upwardly extending support member attached at the right rear of said base, wherein the upwardly extending support member attached at the left front corner of said base is bent to form a second cross member that engages a midpoint of the upwardly extending support member attached at the left rear of said base, and wherein the upwardly extending support member attached at the right rear of said base connects to the upwardly extending support member attached at the left rear of said base forming an upper section that is inwardly bowed to form a handle.

9. The support frame of claim 8 wherein blower mounts are provided on said first and second cross members.

10. The support frame of claim 9 further comprising a positive pressure blower mounted in said support frame.

11. A support frame for a positive pressure blower comprising:
    a. a generally rectangular base comprising two generally parallel elongated front and rear support members, and two generally parallel left and right side support members said side support members being generally perpendicular to said front and rear support members, wherein ends of said front and rear support members are attached to ends of said left and right support members forming four corners: left front, left rear, right front and right rear;
    b. at least two wheels mounted in parallel to said front and rear members, and across from each other at said right front and right rear corners, wherein one of said wheels is mounted flush against said front support member and the other of said wheels is mounted flush against said rear support member;
    c. at least one pair of stops provided across from each other and underneath said left front and left rear corners; and
    d. four upwardly extending support members attached to each of said four corners of said base wherein the two rear support members extend upward from said left rear and right rear corners to a cross member which extends between and connects said rear support members, and wherein the two front support members extend from said left front and right front corners and are angled so as to form first and second cross members that connect to intermediate portions of adjacent rear support members.

12. The support frame of claim 11 further comprising a support bracket mounted on said frame for holding a power supply.

13. The support frame of claim 12 wherein said support bracket comprises a back, two sides and a bottom defining an interior region for receiving said power supply.

14. The support frame of claim 13 wherein said support bracket further comprises a pair of tabs, one tab on each of said sides, for receiving ends of a flexible strap to hold said power supply in said support bracket.

15. The support frame of claim 11 further comprising a plurality of mounting members for attaching a positive pressure blower to said frame.

16. The support frame of claim 11 further comprising a second pair of stops provided across from each other and underneath said right front and right rear corners.

17. The support frame of claim 11 further comprising a second set of wheels provided in parallel to said front and rear members, and across from each other at said left front and left rear corners.

18. The support frame of claim 11 further comprising a handle on said cross member.

19. The support frame of claim 11 wherein blower mounts are provided on said first and second cross members.

20. A support frame for a positive pressure blower comprising:
a. a generally horizontal base comprising a first pair of generally parallel support members, and a second pair of generally parallel support members that are longer than said first support members, said first support members being generally parallel to said second support members, wherein ends of said first support members are attached to ends of said second support members forming a generally rectangular shape with four corners;
b. at least one pair of wheels mounted in parallel each other, and across from each other at lower end corners of said base such that said wheels rotate in parallel to said front and rear members thereby allowing said frame to be tilted and rolled in a sideways direction, wherein each of said wheels is mounted flush against respective first support members;
c. at least one upwardly extending support member attached to said base;
d. at least one handle member on said upwardly extending member for manipulating said frame; and
e. a positive pressure blower mounted in said frame.

21. A support frame for a positive pressure blower comprising:
a. a generally horizontal base comprising a first pair of generally parallel support members, and a second pair of generally parallel support members that are longer than said first support members, said first support members being generally perpendicular to said second support members, wherein ends of said first support members are attached to said second support members forming a generally rectangular shape with four intersections;
b. four generally vertically extending support members, each such member having one end attached to and extending from each of said four intersections of said base;
c. a pair of oppositely positioned cross members, each cross member being attached to and extending between two of said upwardly extending members;
d. at least one pair of wheels mounted across from each other on said second members near two of said intersections such that said wheels rotate in parallel to said second members, wherein each of said wheels is mounted flush against respective first support members;
e. a mounting member located on each of said cross members for attaching a positive pressure blower to said frame; and
f. a support bracket attached to at least one of said vertically extending support members for holding a power supply.

22. The support frame of claim 21 further comprising a positive pressure blower mounted to said mounting members.

* * * * *